United States Patent
Zimowski (10) Patent No.: US 7,343,412 B1
(45) Date of Patent: Mar. 11, 2008

(54) METHOD FOR MAINTAINING AND MANAGING DYNAMIC WEB PAGES STORED IN A SYSTEM CACHE AND REFERENCED OBJECTS CACHED IN OTHER DATA STORES

(75) Inventor: Melvin Richard Zimowski, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1149 days.

(21) Appl. No.: 09/602,412

(22) Filed: Jun. 23, 2000

Related U.S. Application Data (60) Provisional application No. 60/140,711, filed on Jun. 24, 1999.

(51) Int. Cl.
*G06F 15/16* (2006.01)
*G06F 15/173* (2006.01)

(52) U.S. Cl. .................. 709/226; 709/203; 709/217; 709/224; 709/229

(58) Field of Classification Search ........ 709/217–219, 709/204, 203, 214, 229, 224, 226, 216, 206; 707/3, 206, 10; 711/118, 122, 124, 133, 711/137, 141, 4, 134; 370/249; 725/63; 715/513
See application file for complete search history.

(56) References Cited

U.S. PATENT DOCUMENTS

| 5,659,547 | A | * | 8/1997 | Scarr et al. ............. 714/4 |
| 5,740,430 | A | | 4/1998 | Rosenberg et al. |
| 5,878,223 | A | | 3/1999 | Becker et al. |
| 5,894,554 | A | | 4/1999 | Lowery et al. |
| 5,991,306 | A | * | 11/1999 | Burns et al. ............. 370/429 |
| 5,991,810 | A | * | 11/1999 | Shapiro et al. .......... 709/229 |
| 6,119,153 | A | * | 9/2000 | Dujari et al. ............ 709/218 |
| 6,185,608 | B1 | * | 2/2001 | Hon et al. ............... 709/216 |
| 6,209,003 | B1 | * | 3/2001 | Mattis et al. ............ 707/206 |
| 6,256,712 | B1 | * | 7/2001 | Challenger et al. ...... 711/141 |
| 6,266,742 | B1 | * | 7/2001 | Challenger et al. ...... 711/133 |
| 6,272,598 | B1 | * | 8/2001 | Arlitt et al. ............. 709/219 |
| 6,298,356 | B1 | * | 10/2001 | Jawahar et al. ......... 707/201 |
| 6,298,373 | B1 | * | 10/2001 | Burns et al. ............. 709/203 |
| 6,334,145 | B1 | * | 12/2001 | Adams et al. ........... 709/217 |
| 6,338,117 | B1 | * | 1/2002 | Challenger et al. ...... 711/122 |
| 6,345,292 | B1 | * | 2/2002 | Daugherty et al. ...... 709/214 |
| 6,347,312 | B1 | * | 2/2002 | Byrne et al. ............. 707/3 |

(Continued)

OTHER PUBLICATIONS

Challenger et al.; A Scalable System for Consistenly Caching Dynamic Web Data; Mar. 21-25, 1999; INFOCOM '99. Eighteenth Annual Joint Conference of the IEEE Computer and Communications Societies. Proceedings. IEEE, vol. 1.*

(Continued)

*Primary Examiner*—Quang N. Nguyen
(74) *Attorney, Agent, or Firm*—Sughrue Mion, PLLC (57) ABSTRACT

A method, apparatus, and article of manufacture for managing data stored in a data storage device connected to a computer. In accordance with the present invention, it is determined that a web page is to be cached. The web page references other objects. The referenced objects are stored in one or more data stores. The web page is cached. The cached web page and the referenced objects are managed in a coordinated fashion to ensure the display of a complete Web page.

17 Claims, 2 Drawing Sheets

U.S. PATENT DOCUMENTS

| | | |
|---|---|---|
| 6,351,767 B1 * | 2/2002 | Batchelder et al. .......... 709/219 |
| 6,366,947 B1 * | 4/2002 | Kavner ........................ 709/203 |
| 6,393,526 B1 * | 5/2002 | Crow et al. .................. 711/137 |
| 6,408,296 B1 * | 6/2002 | Acharya et al. ............... 707/10 |
| 6,408,360 B1 * | 6/2002 | Chamberlain et al. ....... 711/124 |
| 6,453,339 B1 * | 9/2002 | Schultz et al. ............... 709/206 |
| 6,522,738 B1 * | 2/2003 | Cruickshank et al. ........ 719/315 |
| 6,526,580 B2 * | 2/2003 | Shimomura et al. ........... 725/63 |
| 6,542,967 B1 * | 4/2003 | Major ......................... 711/134 |
| 6,601,090 B1 * | 7/2003 | Gurijala et al. .............. 709/213 |
| 6,769,019 B2 * | 7/2004 | Ferguson .................... 709/219 |
| 7,100,106 B1 * | 8/2006 | Ramaley et al. ............. 715/513 |
| 2001/0034814 A1 * | 10/2001 | Rosenzweig ................ 709/203 |

OTHER PUBLICATIONS

Challenger et al.; Distributed Cache Manager and API; Oct. 1997; Technical Report RC 21004, IBM Research Division.*

Iyengar, A., et al. "Improving web server performance by caching dynamic data", Proceedings of the USENIX Symposium on Internet Technologies and Systems, pp. 49-60, Published: Berkeley, CA, USA, 1997, 262 pp.

* cited by examiner

FIG. 1

FIG. 2

METHOD FOR MAINTAINING AND MANAGING DYNAMIC WEB PAGES STORED IN A SYSTEM CACHE AND REFERENCED OBJECTS CACHED IN OTHER DATA STORES

PROVISIONAL APPLICATION

This application claims the benefit of U.S. Provisional Application No. 60/140,711 entitled "TECHNIQUE FOR MAINTAINING AND MANAGING DYNAMIC WEB PAGES STORED IN A SYSTEM CACHE AND REFERENCED OBJECTS CACHED IN OTHER DATA STORES," filed on Jun. 24, 1999, by Mel Zimowski, which is incorporated by reference herein.

BACKGROUND OF THE INVENTION

1. Field of the Invention

This invention relates in general to computer-implemented systems, and, in particular, to maintaining and managing dynamic web pages and objects referenced by the web pages.

2. Description of Related Art

The Internet computer network is a collection of computer networks that exchange information via the Transmission Control Protocol/Internet Protocol ("TCP/IP") protocol suite. Currently, the use of the Internet computer network for commercial and non-commercial uses is exploding. Via its networks, the Internet computer network enables users in different locations to access information stored in data sources (e.g., databases) on servers distributed across these networks.

The World Wide Web (i.e., the "WWW" or the "Web") is a hypertext information and communication system used on the Internet computer network with data communications operating according to a client/server model. Typically, a user of a Web browser at a Web client computer will request data stored in data sources from a Web server computer, at which Web server software resides. The Web server software interacts with other computer programs that use interfaces to connect to these data sources, for example, a database managed by a Database Management System ("DBMS"), or uses the interfaces directly to access these data sources. These computer programs residing at the Web server computer transmit the requested data to the client computer in worldwide web documents referred to as web pages. The data can be of many different types of information, including database data, images, video clips, or audio tracks.

Web pages can be static web pages (i.e. web pages with fixed content that are pre-generated long before the Web client request is issued) or dynamic web pages (i.e., web pages whose content is dynamically generated at the time the web client request is processed).

Dynamic web pages are typically expensive to generate because they contain data that must be obtained dynamically at web servers from either local or remote data sources. For this reason, web server caches are often used to store dynamic Web pages that are requested by multiple users. These caches are of finite size and have limits on the number of web pages they can contain. Further, the need for retaining individual pages within the cache varies over time. Thus, without proper maintenance, the storage allocated to the cache may become completely used up or the content of the cache may become outdated.

A web page may and often does contain hypertext links to objects stored in data stores (e.g., a local file system) that can be accessed by the web server that serves the web page. These hypertext links permit the objects that they reference to be made available to a user at a web browser as an integral part of the web page that contains them. Thus, the web page appears incomplete if it is served to a user and the objects referenced through these hypertext links cannot be materialized as required by the web page or user.

When web pages are generated dynamically, it is not possible to predetermine the objects that will be referenced within these web pages using hypertext links. In addition, when dynamic web pages are stored in a system cache for reuse, the relationship between the web page and the objects that it references is no longer momentary. Thus, unless the contents of the system cache and the data stores containing the objects referenced in the web page are properly managed, incomplete web pages could easily be displayed at web browsers. Accordingly, the providers of web sites need to manage the contents of a dynamic web page system cache and the contents of the data stores containing objects that are referenced by hypertext links that occur within those dynamic web pages in a coordinated fashion.

Thus, there is a need in the art for improved techniques for maintaining and managing dynamic web pages stored in system caches and objects referenced by the web pages.

SUMMARY OF THE INVENTION

To overcome the limitations in the prior art described above, and to overcome other limitations that will become apparent upon reading and understanding the present specification, the present invention discloses a method, apparatus, and article of manufacture for managing data stored in a data storage device connected to a computer.

In accordance with the present invention, it is determined that a web page is to be cached. The web page references other objects. The referenced objects are stored in one or more data stores. The web page is cached. The cached web page and the referenced objects are managed in a coordinated fashion to ensure the display of a complete web page.

BRIEF DESCRIPTION OF THE DRAWING

Referring now to the drawings in which like reference numbers represent corresponding parts throughout.

DETAILED DESCRIPTION

In the following description, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

A. Overview

One embodiment of the present invention provides a management system for maintaining and managing dynamic web pages and objects referenced in the web pages. The preferred embodiment of the invention provides techniques for managing the contents of a dynamic web page system cache and related data stores containing objects that the web pages reference while also ensuring the completeness of cached web pages that are subsequently reused for display at browsers.

The preferred embodiment of the invention uses a DBMS (e.g., DB2® from International Business Machines Corporation) to cache dynamic web pages and to track dependencies that the dynamic web pages have on large objects cached in the local UNIX file system (in particular, the Hierarchical File System available under OS/390® UNIX System Services). The preferred embodiment of the invention provides tools for managing the contents of the dynamic web page cache and the large object cache, while also ensuring that the management is performed in such a way as to guarantee the completeness of any cached web pages that are displayed at a browser.

B. Hardware Environment

Figure 1:
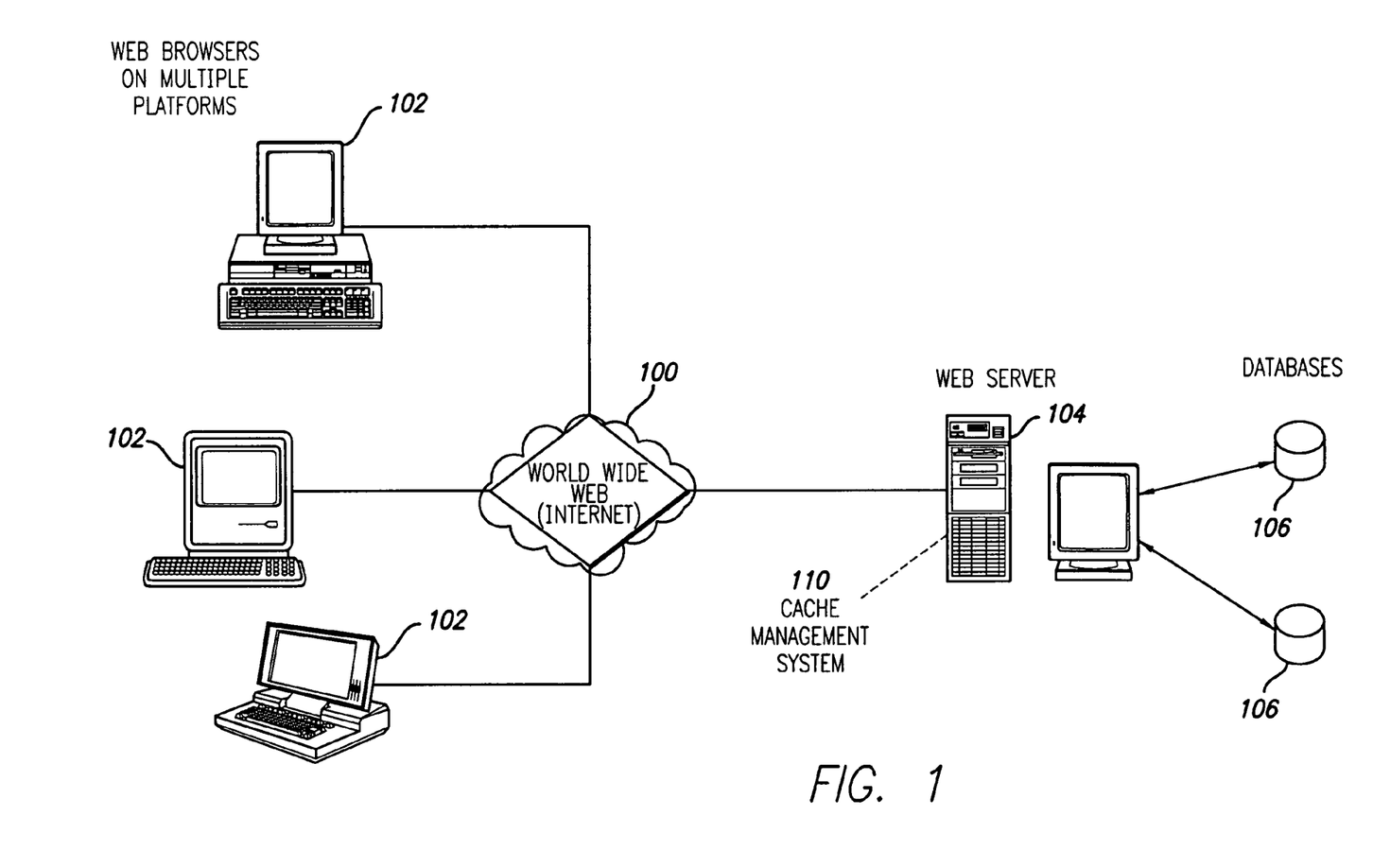
FIG. 1 schematically illustrates the hardware environment of a preferred embodiment of the present invention, and more particularly, illustrates a typical distributed computer system using the Internet.

FIG. 1 schematically illustrates the hardware environment of a preferred embodiment of the present invention, and more particularly, illustrates a typical distributed computer system using the Internet 100 to connect Web client computers 102 executing Web browsers to a Web server computer 104 executing Web server software and other computer programs that connect the server system 104 to data sources 106. A typical combination of resources may include client computers 102 that are personal computers or workstations, and a web server computer 104 that is a personal computer, workstation, minicomputer, or mainframe. These systems are coupled to one another by various networks, including LANs, WANs, SNA networks, and the Internet.

A Web client computer 102 typically executes a Web browser and is coupled to a Web server computer 104 executing Web server software. The Web browser is typically a program such as Microsoft's Internet Explorer® or Netscape Navigator®. The Web server software is typically a program such as IBM's HTTP Server or other WWW server software. The software executing on the Web server uses a data source interface and, possibly, other computer programs, for connecting to the data sources 106. The software executing on the Web server may also include a cache management system 110. The client computer 102 is bi-directionally coupled with the Web server computer 104 over a line or via a wireless system. In turn, the Web server computer 104 is bi-directionally coupled with data sources 106.

The data source interface permits the software executing on the Web Server to be connected to a Database Management System (DBMS), which supports access to a data source 106 by executing DBMS software. The DBMS may be located on the same server as the Web server computer 104 or may be located on a separate machine. The data sources 106 may be geographically distributed. The software executing on the Web server translates the request received from a Web browser into one or more statements (e.g., a macro file or a COBOL program) that can be processed to retrieve data from data sources 106.

Those skilled in the art will recognize many modifications may be made to this configuration without departing from the scope of the present invention.

C. Dynamic Web Page Caching Overview

1. Overview of Design

The caching of dynamic web pages enhances the Web server's ability to quicky serve web pages containing dynamic content. In the preferred embodiment, ASCII encoded web pages are cached in a database for reuse by the cache management system 110. This eliminates the costs associated with reconstructing a dynamic web page that is requested by multiple users. Web pages can be HTML web pages or XML documents.

A cached page is static, as the content of a cached page reflects the state of data stores and business logic at the time the web page was created. Subsequent changes to the data stores and business logic do not affect the content of the cached page.

Caching directives are used to specify, among other things, the web pages to be cached. A number of factors affect whether web pages should be cached. More specifically, a page should be cached when the page is repeatedly requested by users and when the content of the page changes infrequently. A pages should not be cached when the processing associated with the generation of the web page makes changes to data sources. If a cached web page is used to respond to a user's request, the processing logic associated with the generation of the cached page is not executed and no changes are made to the data sources.

When the cache management system 110 (also referred to as the management system) is configured as a CGI application, the caching directives are processed for each cache management system user request. When the cache management system 110 is configured as a Web server plugin or as a servlet, the caching directives are processed once per web server address space at the time the first management system request is assigned to a worker thread associated with that address space. For additional information about worker threads, refer to pending U.S. patent application Ser. No. 09/104,879, filed Jun. 25, 1998 by M. Zimowski, S. Greenspan, P. Livecchi, and J. Aman, entitled "METHOD AND SYSTEM FOR MANAGING CONNECTIONS TO A DATABASE MANAGEMENT SYSTEM".

Stored procedures are provided by the cache management system 110 for managing the contents of the cache.

2. Web Page Caching Directives

In the preferred embodiment, authorized Web server administrators configure the cache management system 110 to cache web pages by adding caching directives to the management system initialization file (db2www.ini).

In particular, the DTW_CACHE_PAGE directive is used to specify web pages that are to be cached by the cache management system 110. If the management system initialization file does not contain a DTW_CACHE_PAGE directive, then no web pages are cached. The following is the syntax for the DTW_CACHE-PAGE directive:

DTW_CACHE_PAGE [=] file_name_spec|path_template_spec lifetime usage_scope

The term file_name spec refers to the specification of one or all blocks within a macro file using the fully qualified name of the macro file. A macro file is an installation-provided application that the cache management system 110 executes to generate one or more web pages. A block is a subsection of a macro that is capable of generating a specific web page. For example, DTW_CACHE_PAGE=/u/US-RND01/macros/custqord.d2w/Output specifies the caching of the web page created by the execution of the block Output in macro custqord.d2w in the directory /u/USRND01/macros. In the following additional example, DTW_CACHE_PAGE=/u/USRND01/macros/custqord.d2w/* specifies the caching of all web pages created by the execution of any block in macro custqord.d2w in the directory /u/USRND01/macros.

The term path_template_spec refers to the specification of blocks within macro files using a path template for one or more directories containing macro files. A path template contains the suffix/*. The management system caches all web pages created by the execution of blocks in macro files contained within the directory or directories that match the path template. For example, DTW_CACHE_PAGE=/u/US-RND01/macros/* specifies the caching of web pages created by the execution of blocks in all macros contained within the directory /u/USRND01/macros and any subdirectory of /u/USRND01/macros. In the following additional example, DTW_CACHE_PAGE=/* specifies the caching of all web pages created by all management system macros.

The term lifetime refers to the minimum number of seconds that a cached web page is valid.

The term usage_scope specifies the degree to which the reuse of the web page is restricted. Reuse is granted or denied based on the authority of the userid associated with the request. Usage scope can have a value of PUBLIC or PRIVATE. PUBLIC means that the cached web page should be served (i.e., returned to a user) when the user request matches the cache key (discussed in further detail below), the cached page is valid, and the userid associated with the web server thread or process processing the request is authorized to execute the macro that generated the page. PRIVATE means that the cached web page should be served when the user request matches the cache key (discussed in further detail below), the cached page is valid, and the userid associated with the web server thread or process processing the request is the same as the userid that was associated with the web server thread or process that cached the web page.

The caching directive can be specified multiple times. Namely, a different caching directive (i.e., DTW_CACHE_PAGE directive) can be specified for each file_name_spec or path_template_spec value. When the caching directives conflict with each other, the first directive specified takes precedence.

A cached page is reused for a request when the URL, the form data, and the query string of the request match the URL, form data, and query string of the request that caused the web page to be cached. Examples of caching directives are shown below:

EXAMPLE 1

Specifies the Caching of any Web Pages Generated when the Cache Management System Executes a Particular HTML Block in the Specified Macro DTW_CACHE_PAGE /u/USER1/macros/main.d2w/output 3600 PUBLIC In this example, the cache management system caches the Web pages generated when it executes the output block in the macro main.d2w, located in the /u/USER1/macros directory. The Web pages have PUBLIC scope, and remain valid for at least 1 hour.

EXAMPLE 2

Specifies the Caching of any Web Pages Generated when the Cache Management System Executes any Block in the Specified Macro DTW_CACHE_PAGE /u/USER1/macros/main.d2w/* 1800 PUBLIC In this example, the cache management system caches any Web pages the cache management system generates when it executes any block in the macro main.d2w, located in the /u/USER1/macros directory. The Web pages have PUBLIC scope, and remain valid for at least 30 minutes.

EXAMPLE 3

Specifies the Caching of any Web Pages Generated when the Cache Management System Executes Blocks in Macros Located in One or More Directories DTW_CACHE_PAGE /u/USER1/macros/* 3600 PRIVATE In this example, the cache management system caches any Web pages the cache management system generates when it executes any block in any macro located in the /u/USER1/macros directory or any of its subdirectories. The Web pages have PRIVATE scope, and remain valid for at least 1 hour.

EXAMPLE 4

Specifies the Caching of any Web Page Generated by all Macros

DTW_CACHE_PAGE/* 3600 PUBLIC

In this example, the cache management system caches all Web pages that the cache management system generates. The Web pages have PUBLIC scope, and remain valid for at least 1 hour.

EXAMPLE 5

Specifies Multiple Web Pages Caching Directives

DTW_CACHE_PAGE /u/USER1/macros/main/* 1800 PUBLIC

DTW_CACHE_PAGE /u/USER1/macros/special/daily_news.d2w/* 43200 PUBLIC

DTW_CACHE_PAGE /u/USER1/macros/special/employee_stats.d2w/* 3600 PRIVATE

In this example, the cache management system caches the following: (1) All Web pages generated from any block in any macro located in the /u/USER1/macros/main/ directory. The Web pages have PUBLIC scope and remain valid for at least 30 minutes. (2) All Web pages generated by the daily_news.d2w macro in the directory /u/USER1/macros/special/. These Web pages have PUBLIC scope and remain valid for at least 12 hours. (3) All Web pages generated by the employee_stats.d2w macro in the directory /u/USER1/macros/special/. These Web pages have PRIVATE scope and remain valid for at least 1 hour.

After the web pages to be cached have been specified, the table used to cached the web pages must be set up. The following steps are necessary to set up the table used to cache the web pages:

a. Create the Web page cache table, SYSIBM.DTWCACHEPAGES.

b. Define the stored procedure used to insert the cached pages into SYSIBM.DTWCACHEDPAGES to the DBMS.

c. Prepare the stored procedure for execution using a user ID with INSERT, SELECT, and DELETE privileges on SYSIBM.DTWCACHEDPAGES. The user IDs associated with the requests that cache pages must have the EXECUTE privilege for the stored procedure.

After the above three steps are completed, web pages can be cached.

3. Web Page Cache Key

The actual cache key for the cached dynamic web page consists of path information, macro name, HTML or XML block name, plus the query string plus the form data (if present) that caused the dynamic web page to be generated.

D. Management System Dynamic Web Page Cache and Referenced Object Data Store Consistency 1. Management System Objectives Regarding Cache Consistency A web page may be defined as a set of HTML tags or an XML (Extensible Mark-up Language) document and the objects (e.g., DB2 large objects or LOBs) referenced by the web page using hypertext links.

The contents of a cached web page reflect the state of data stores and business logic at the time the cached web page was created. Thus, a cached web page is static.

A cached web page is automatically deleted upon expiration of its lifetime (i.e., lifetime value plus creation time), when automatic management is enabled, or until deleted by an authorized web server administrator.

The following are elements that the management system is designed to achieve regarding dynamic web page cache and referenced object consistency. When serving a cached web page, the management system maintains the consistency that existed at the time the cached web page was created. The removal of a referenced object from its data store (e.g. the local UNIX file system) invalidates the cached dynamic web page that references the object. The removal of a dynamic web page from the management system cache invalidates referenced objects stored in the referenced object data store.

A web page is not returned to a user at a browser until all LOBs referenced in the web page are successfully placed in the referenced object data store. Additionally, the web page is not cached until all LOBs referenced in the web page are successfully placed in the referenced object data store. When a web page is removed from the dynamic Web page cache, any LOBs referenced by that web page are removed from the referenced object data store. When a LOB is removed from the referenced object data store, any web page that references the LOB is removed from the dynamic Web page cache and any other LOBs referenced by that web page are removed from the referenced object data store. The cached web page is always removed before any dependent LOBs are removed from the referenced object data store.

2. The Management System Dynamic Web Page Cache

ASCII encoded web pages are cached in a data store for reuse by the management system. In the preferred embodiment, referenced objects are large objects (LOBs). Caching directives specify the web pages to be cached and the minimum number of seconds the cached page is valid. The key of a cached page consists of path information, macro name, HTML or XML block name, plus query string plus form data (if present). Cached web pages are classified by usage scope: PUBLIC or PRIVATE.

The DB2 dynamic web page cache table is: SYSIBM.DTWCACHEDPAGES. The index key for a cached page in the dynamic web page cache table is: INDEXED_KEY CHAR(250), which is the first 250 characters of path information, macro name, HTML or XML block name, query string, and form data. An identifier is specified by: ID INTEGER, which is an identifier derived from path information, macro name, HTML or XML block name, query string, and form data. To provide fast access to the cache, an index to the dynamic web page cache table is provided that consists of both the column for the INDEXED_KEY and the column for the ID.

The actual key of a cached page is: ACTUAL_KEY VARCHAR(4000), which is comprised of the path information, macro name, HTML or XML block name, query string, and form data for the request that created the cached page.

The userid of the creator is: CREATOR CHAR(8), which is the userid associated with a request that created the cached page. The creation timestamp is: CREATION_TIME TIMESTAMP, which specifies the date and time of the creation of the cached page. This date and time is the same as the CREATION_TIME for any LOBs that the web page references.

The expiration timestamp is: EXPIRATION_TIME TIMESTAMP, which specifies the date and time of expiration of the cached page (value of CREATION_TIME+ lifetime value from DTW_CACHE_PAGE directive). A second index for the dynamic web page cache table is provided that consists of the column for EXPIRATION_TIME. The indexed column (i.e., EXPIRATION_TIME) of the second index is used to efficiently identify the cached web pages that have expired.

The size is: SIZE INTEGER, which specifies the size of the cached page in bytes. The usage scope is: USAGE_SCOPE SMALLINT; a value of 1 means that the page has a PUBLIC usage scope and a value of 2 means that the page has a PRIVATE usage scope. The ordinal position of the segment is: ORDINAL_POSITION SMALLINT, which specifies the ordinal position of the web page segment within the complete cached page. The dynamic web page segment is: PAGE_SEGMENT VARCHAR(28100) FOR BIT DATA, which is the ASCII encoded web page segment.

3. Dynamic Web Page/LOB Dependency Table

A dynamic web page/LOB dependency table must be created and several stored procedures must be installed before the cache management system 110 can manage cached web pages and LOBs. The steps necessary to created the web page dependency table are outlined below:

a. The dynamic Web page/LOB dependency table contains information about the LOB files stored in HFS and about the relationship that these files may have, if any, to Web pages stored in the dynamic Web page cache.

(i) Create the dynamic Web Page/LOB dependency table, SYSIBM.DTWCACHEDEPS.

(ii) Define the stored procedure used to insert the dependency information into SYSIBM.DTWCACHEDEPS to the DBMS.

(iii). Prepare the stored procedure for execution using a user ID with INSERT, SELECT, and DELETE privileges on SYSIBM.DTWCACHEDEPS. The user IDs associated with the requests that retrieve LOBs must have the EXECUTE privilege for the stored procedure.

b. Create the stored procedure that performs automatic management of the Web page cache and LOBs.

(i) Define the stored procedure to the DBMS.

(ii) Prepare the stored procedure for execution using a user ID with the DELETE privilege on SYSIBM.DTWCACHEPAGES and SYSIBM.DTWCACHEDEPS. The user IDs that execute macros must have the EXECUTE privilege for the stored procedure.

c. Create the stored procedure that is used for more advanced management of the Web page cache and LOBs.
   (i) Define the stored procedure to the DBMS.
   (ii) Prepare the stored procedure for execution using a userid with the DELETE privilege on SYSIBM.DTWCACHEPAGES and on SYSIBM.DTWCACHEDEPS. The userids that execute the management system-provided macro must have the EXECUTE privilege for the stored procedure.

4. Dynamic Web Page/LOB Dependency Table Details

The DB2 web page/LOB dependency table is: SYSIBM.DTWCACHEDEPS. The indexed key for a cached page in the DB2 web page/LOB dependency table is: INDEXED_KEY CHAR(250), which specifies the first 250 characters of path information, macro name, HTML or XML block name, query string, and form data for the request that created the cached page. The identifier is: ID INTEGER, which specifies an identifier derived from path information, macro name, HTML or XML block name, query string, and form data for the request that created the cached page. An index to the DB2 web page/LOB dependency table is provided that consists of both the column for the INDEXED_KEY and the column for the ID.

Actual key of the cached page is: ACTUAL_KEY VARCHAR(4000)—path information, macro name, HTML or XML block name, query string, and form data for the request that created the cached page. The fully qualified HFS filename for the LOB is: FILENAME VARCHAR(1024).

The creation timestamp is: CREATION_TIME TIMESTAMP, which specifies the date and time of the creation of the LOB. This date and time is the same as the CREATION_TIME for the web page that references the LOB.

The expiration timestamp is: EXPIRATION_TIME TIMESTAMP, which specifies the date and time for expiration of the LOB (value of CREATION_TIME+ DTW_LOB_LIFETIME configuration value, when dynamic web page caching not in use; value of CREATION_TIME+ max(DTW_LOB_LIFETIME configuration value, lifetime, value from DTW_CACHE_PAGE directive) when dynamic web page caching in use). A second index for the DB2 web page/LOB dependency table is provided that consists of the column for EXPIRATION_TIME. The indexed column (i.e., EXPIRATION_TIME) of the second index is used to efficiently identify objects (referenced by a web page) that have expired.

The size is: SIZE INTEGER, which specifies the size of the LOB in bytes.

The SYSIBM.DTWCACHEDPAGES and the SYSIBM.DTWCACHEDEPS DB2 tables are shown below. SYSIBM.DTWCACHEDPAGES is the dynamic Web page cache table. This table contains the cached Web pages and information about the cached Web pages.

TABLE 1

SYSIBM.DTWCACHEDPAGES

| Column: Column Datatype | Description |
| --- | --- |
| INDEXED_KEY: CHAR(250) | Indexed key for cached page: the first 250 characters of the actual key |
| ID: INTEGER | Identifier: an identifier derived from the key |
| ACTUAL_KEY: VARCHAR(4000) | The actual key of the cached page: the path information, macro name, HTML or XML block name, query string, and form data of the request that generated the page. |
| CREATOR: CHAR(8) | User ID of creator: user ID associated with the request that created the cached page. |
| CREATION_TIME: TIMESTAMP | Creation timestamp: date and time of creation of cached page. It is the same as the CREATION_TIME for any LOBs that the Web page references. |
| EXPIRATION_TIME: TIMESTAMP | Expiration timestamp: date and time for expiration of cached page (value of CREATION_TIME + lifetime value from DTW_CACHE_PAGE directive) |
| SIZE: INTEGER | Size: size of cached page in bytes |
| USAGE_SCOPE: SMALLINT | Usage scope: a value of 1 means that the page has a PUBLIC usage scope and a value of 2 means that the page has a PRIVATE usage scope |
| ORDINAL_POSITION: SMALLINT | Ordinal position of segment: the ordinal position of the Web page segment within the complete cached page Dynamic Web page segment: the ASCII encoded Web page segment |
| PAGE_SEGMENT VARCHAR(28100)FOR BIT DATA | |

SYSIBM.DTWCACHEDEPS is the Web page dependency table. This table contains information about the LOBs referenced by Web pages.

TABLE 2

SYSIBM.DTWCACHEDEPS

| Column: Column Datatype | Description |
| --- | --- |
| INDEXED_KEY: CHAR(250) | Indexed key for Web page: first 250 characters of the actual key |
| ID: INTEGER | Identifier: an identifier derived from the actual key |
| ACTUAL_KEY: VARCHAR(4000) | The actual key of the cached page: the path information, macro name, HTML or XML block name, query string, and form data of the request that generated the page. |
| FILENAME: VARCHAR(1024) | Fully qualified HFS filename for the LOB |
| CREATION_TIME: TIMESTAMP | Creation timestamp: date and time of the creation of the LOB. Is the same as the CREATION_TIME for the Web page that references this LOB |
| EXPIRATION_TIME: TIMESTAMP | Expiration timestamp: date and time of the expiration of the LOB (value of CREATION_TIME + DTW_LOB_LIFETIME configuration value when dynamic web page caching not in use; value of CREATION_TIME + max(DTW_LOB_LIFETIME configuration value, lifetime value from DTW_CACHE_PAGE directive) when dynamic web page caching in use) |
| SIZE: INTEGER | Size: size of the LOB in bytes |

5. Managing LOBs and Cached Web Pages

LOBs referenced in web pages are stored as files in a single HFS directory. The name of the directory is specified by the HTML_PATH configuration statement of the management system initialization file.

The settings of two configuration variables control the manner in which LOBs and cached web pages are automatically managed. The configuration variable DTW_LOB_LIFETIME specifies the minimum number of seconds LOBs are available. The default is 0 seconds. When dynamic web page caching is in use, the minimum number of seconds a LOB is available is the larger of the value of DTW_

LOB_LIFETIME and the lifetime value specified in the caching directive for the dynamic web page that references the LOB. The configuration variable DTW_CACHE_MANAGEMENT_INTERVAL specifies a minimum number of seconds between successive automatic cache management attempts. The default is 0 seconds. A value of 0 means that the cache management system 110 will not perform automatic cache management.

Cached web pages and LOBs are automatically managed by the management system using DB2 stored procedures. Additionally, a management system-provided macro permits Web server administrators to manage LOBs and cached web pages in more sophisticated ways using a stored procedure.

6. Automatic Cache Management

When automatic cache management occurs, all cached dynamic web pages and LOBs with expiration timestamps that precede the current timestamp are automatically deleted.

The following are the logical steps for automatic cache management:
   Delete cache table entries where expiration timestamp<current timestamp
   Select dependency table entries where expiration timestamp<current timestamp
   For each selected dependency table entry:
      Delete HFS file identified by HFS filename for LOB
      Delete dependency table entry 7. More Advanced Cache Management The management system provides a macro that allows a system administrator to execute a management system provided stored procedure to perform cache management. Use of this macro is referred to as more advanced cache management.

When more advanced cache management occurs, all cached dynamic web pages and LOBs with expiration timestamps that precede the current timestamp are automatically deleted.

The management system-provided macro for the more advanced management of the caches permits the user to perform the following types of management. First, a cleanup operation may be requested that deletes all cached dynamic web pages and LOBs with expiration timestamps that precede the current timestamp. Second, web pages may be deleted from the dynamic web page cache based on system administrator provided input, such as macro file and block name template values, timestamp values or a combination of name and timestamp values (e.g., delete web pages where key of cached page is like X and creation timestamp is less than some provided timestamp value Y). All cached LOBs that are referenced by the deleted web pages are also deleted. Third, LOBs from the LOB cache may be deleted based on a timestamp value (e.g., delete LOBs where creation timestamp is greater than some provided timestamp value Y). All cached dynamic web pages that contain hypertext references to the LOBs are first deleted.

8. Macro for More Advanced Cache Management

More specifically, the macro for more advanced management of dynamic web pages and LOBs allows a system administrator to specify the following:
   The deletion of all cached dynamic web pages and LOBs with expiration timestamps that precede the current timestamp.
   A macro and block template value, where all dynamic web pages are deleted where ACTUAL_KEY LIKE % value %.
   A starting creation timestamp value: where all dynamic web pages are deleted where creation timestamp > or equal to starting creation timestamp.
   An ending creation timestamp value: where all dynamic web pages are deleted where creation timestamp < or equal to ending creation timestamp.
   Both a starting and an ending creation timestamp value, where all dynamic web pages are deleted where creation timestamp > or equal to starting creation timestamp and < or equal to ending creation timestamp.
   A macro and block template value and a starting creation timestamp value, where all dynamic web pages are deleted where ACTUAL_KEY LIKE % value % and where creation timestamp > or equal to starting creation timestamp.
   A macro and block template value and an ending creation timestamp value where all dynamic web pages are deleted where ACTUAL_KEY LIKE % value % and where creation timestamp < or equal to ending creation timestamp.
   A macro and block template value and both a starting and an ending creation timestamp value, where all dynamic web pages are deleted where ACTUAL_KEY LIKE % value % and where creation timestamp > or equal to starting creation timestamp and < or equal to ending creation timestamp.

The macro for more advanced management of LOBs also allows a user to specify the following:
   A starting creation timestamp value, where all LOBs are deleted where creation timestamp > or equal to starting creation timestamp.
   An ending creation timestamp value, where all LOBs are deleted where creation timestamp < or equal to ending creation timestamp.
   Both a starting and an ending creation timestamp value, where all LOBs are deleted where creation timestamp > or equal to starting creation timestamp and < or equal to ending creation timestamp.

The macro for more advanced management is named manage_cache.d2w.

EXAMPLE 1

To Delete Selected Dynamic Web Pages and Related Large Objects that have been Cached a. Invoke the BEGIN HTML block of the manage_cache.d2w macro.
b. Click on the Delete selected dynamic Web pages and related large object files choice.
   This choice lets you specify a filter and timestamp values for the cached Web pages you want to delete. All expired cached Web pages and LOBs as well as all LOBs referenced by the deleted Web pages are also deleted.
c. Optionally type a string in the Enter the ACTUAL_KEY filter field that matches any part of the ACTUAL_KEY for the Web pages to be deleted. This string acts as filter for selecting the cached Web pages Net.Data deletes. The string can contain up to 250 characters.
   For example, when the following string is entered:
   /netdata/macros/my_macro.d2w/report
   Net. Data deletes all cached Web pages that have an ACTUAL_KEY value containing this string.
d. Optionally click on the Starting CREATION_TIME check box and enter a timestamp value. Net.Data deletes all cached Web pages that have creation times greater than or equal to this timestamp value, and that have creation times less than or equal to the Ending CREATION_TIME, if specified. If no Ending CREATION_TIME value is specified, than Net.Data deletes all cached Web pages that have creation times greater than or equal to the Starting CREATION_TIME value. For example, when the following timestamp is entered:
Starting CREATION_TIME:
Year 1999 Month 03 Day 23 Hour 14 Minute 00 Second 00
Net.Data deletes all cached Web pages that were created on or after 2:00 PM on Mar. 23, 1999 up to and including the value of Ending CREATION_TIME, if specified.

e. Optionally click on the Ending CREATION_TIME check box and enter a timestamp value. Net.Data deletes all cached Web pages that have creation times less than or equal to this timestamp value, and that have creation times greater than or equal to the Starting CREATION_TIME, if specified. If no Starting CREATION_TIME value is specified, then Net.Data deletes all cached Web pages that have creation times less than or equal to the Ending CREATION_TIME value. For example, when the following timestamp is entered:
Ending CREATION_TIME:
Year 1999 Month 03 Day 23 Hour 23 Minute 59 Second 59
Net.Data deletes all cached Web pages that were created on or before 11:59:59 PM on Mar. 23, 1999, starting with the value of Starting CREATION_TIME, if specified.

If the Enter the ACTUAL_KEY filter field is empty and neither of the check boxes are checked, Net.Data deletes only expired cached Web pages and LOBs.

f. Click the EXECUTE push button to proceed, or select Back to the beginning to return to the main page and cancel your request.

EXAMPLE 2

To Delete Large Objects in HFS and Related Web Pages that have been Cached (i) Invoke the BEGIN HTML block of the manage_cache.dtw macro.
(ii) Click on the Delete selected large object files and related dynamic Web pages choice.
This choice lets you specify timestamp values for the LOBs you want to delete. All expired cached Web pages and LOBs as well as all LOBs referenced by deleted Web pages are also deleted.
(iii) Optionally click on the Starting CREATION_TIME check box and enter a timestamp value. Net.Data deletes all LOB files that have creation times greater than or equal to this timestamp value, and that have creation times less than or equal to the Ending CREATION_TIME, if specified. If no Ending CREATION_TIME value is specified, then Net.Data deletes all LOB files that have creation times greater than or equal to the Starting CREATION_TIME value. For example, when the following timestamp is entered:
Starting CREATION_TIME
Year 1999 Month 03 Day 23 Hour 14 Minute 00 Second 00
Net.Data deletes all LOBs that were created on or after 2:00 PM on Mar. 23, 1999, up to and including the value of Ending CREATION_TIME, if specified.
(iv) Optionally click on the Ending CREATION_TIME check box and enter a timestamp value. Net.Data deletes all LOB files that have creation times less than or equal to this timestamp value, and that have creation times greater than or equal to the Starting CREATION_TIME, if specified. If no Starting CREATION_TIME value is specified, then Net.Data deletes all LOB files that have creation times less than or equal to the Ending CREATION_TIME value. For example, when the following timestamp is entered:
Ending CREATION_TIME:
Year 1999 Month 03 Day 23 Hour 23 Minute 59 Second 59
Net.Data deletes all LOB files that were created on or before 11:59:59 PM on Mar. 23, 1999, starting with the value of Starting CREATION_TIME, if specified.
If neither of the check boxes are checked, Net.Data deletes only expired LOB files and cached Web pages.

(v) Click the EXECUTE push button to proceed, or select Back to the beginning to return to the main page and cancel your request.

9. Security Considerations and Guidelines

The userid(s) associated with the threads or processes that execute management system requests must have the EXECUTE privilege for the stored procedure used to add dynamic web pages to the cache and to add dependency information to the dynamic web page/LOB dependency table. Additionally, the userid(s) associated with the threads or processes that execute management system requests must have the authority to add files to the HTML_PATH directory.

The userid(s) associated with the threads or processes that execute the management system requests must also have the EXECUTE privilege for the stored procedure used to automatically manage the dynamic web page and LOB caches. The userid(s) used for more advanced management of LOBs and cached web pages must have the EXECUTE privilege for the stored procedure used to manually manage the dynamic web page and LOB caches.

An administrative userid is typically used to create the HTML_PATH directory and prepare the stored procedures for execution. The administrative userid must have the INSERT, SELECT, and DELETE privileges on the web cache table and on the dynamic web page/LOB dependency table.

Figure 2:
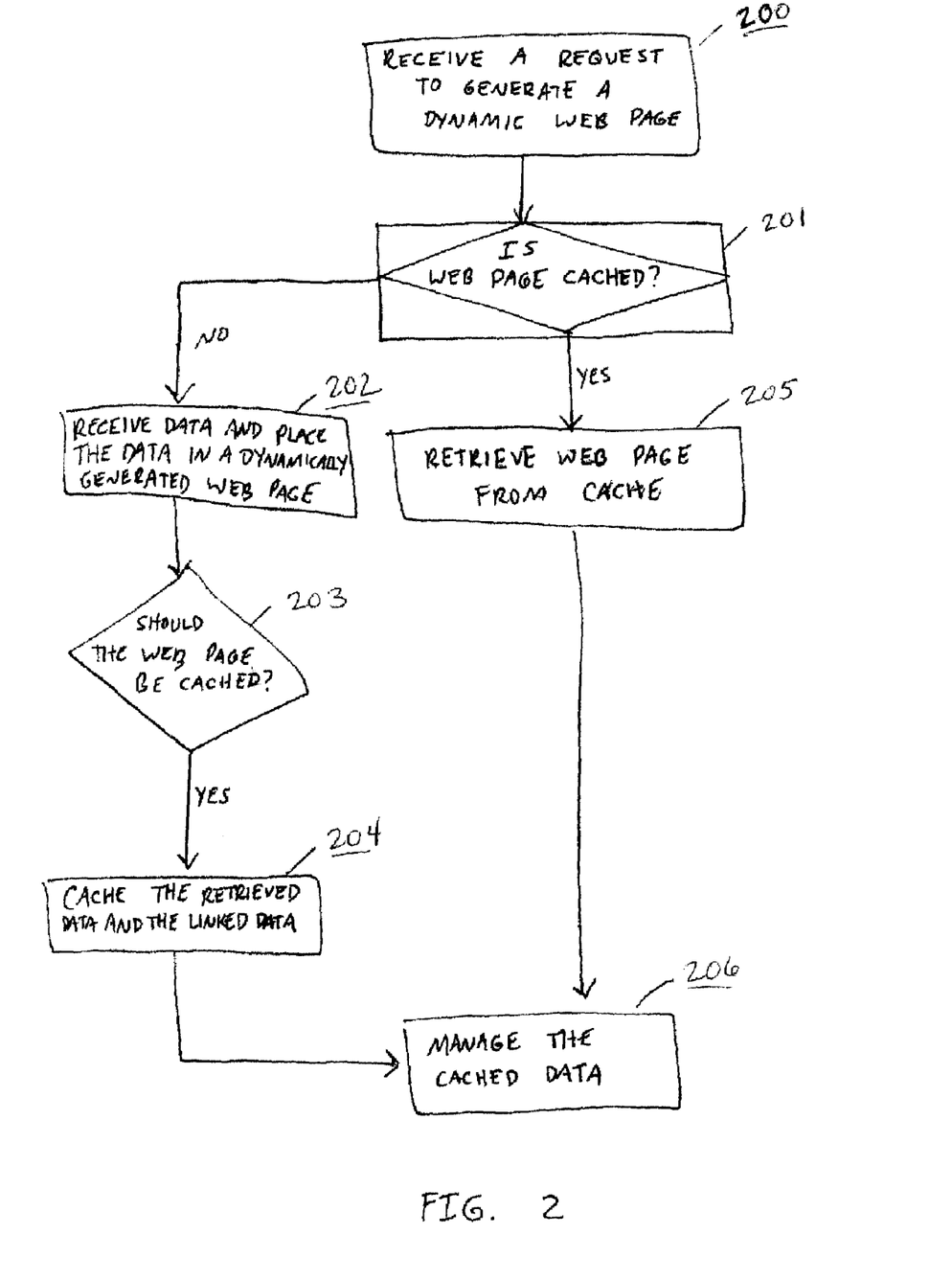
FIG. 2 is a flow chart illustrating the steps performed in accordance with an embodiment of the present invention.

In summary, the preferred embodiment of the present invention provides a technique for managing the contents of a dynamic web page system cache and related data stores containing objects that the web pages reference while also ensuring the completeness of cached web pages that are subsequently reused for display at browsers. The content may be managed by expiration times or in more advanced ways. FIG. 2 is a flow chart illustrating the steps performed in accordance with an embodiment of the present invention.

Block 200 represents an exemplary embodiment of the present invention receiving a request to generate a dynamic web page. According to the exemplary embodiment, it is determined whether the requested web page is cached, as represented by Block 201. If the requested web page is not cached, the data is retrieved and placed in a dynamically generated web page, as represented by Block 202. The retrieved data may be linked to other stored data. Block 203 represents the determination as to whether the web page should be cached. Block 204 represents the present invention caching the retrieved data and the linked data. If the requested web page is cached, the web page is retrieved from the cache, as represented by Block 205. The present invention then manages the cached data, as represented by Block 206.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for responding to a request for a web page, comprising:
   determining whether to respond to a request for a web page by retrieving the web page from a cache or by constructing the web page;
   if it is determined that the request is to be responded to by constructing the web page,
      retrieving data and placing data in the web page, wherein the data is linked to other objects,
      determining that the web page is to be cached, wherein the web page references the other objects;
      storing the referenced objects in one or more data stores; and
      caching the web page in the cache;
   if it is determined that the request is to be responded to by retrieving the web page from the cache, retrieving the web page from the cache;
   automatically managing the cached web page and the referenced objects to ensure the display of a complete web page; and
   when one or more of the referenced objects is deleted, deleting the web page from the cache,
   wherein a system initialization file comprises at least one caching directive which is used in determining whether to cache the constructed web page.

2. The method of claim 1, further comprising, when the web page is deleted from the cache, deleting the referenced objects.

3. The method of claim 1, wherein managing the cached web page and referenced objects comprises the steps of:
   receiving a request from an administrator to delete the retrieved data based on administrator-provided input; and
   deleting the retrieved data based on the administrator-provided input.

4. The method of claim 1, wherein managing the cached web page and referenced objects comprises the steps of:
   receiving a request from an administrator to delete the linked objects based on administrator-provided input; and
   deleting the linked objects based on the administrator-provided input.

5. The method of claim 1, further comprising, processing a caching directive that specifies whether the web page should be cached.

6. The method of claim 1, further comprising, associating an expiration timestamp with the web page, wherein the expiration timestamp defines a time period in which the cached web page is valid.

7. The method of claim 6, wherein managing the cached web page and referenced objects further comprises automatically deleting the web page and the referenced objects when the expiration timestamp precedes a current timestamp.

8. The method of claim 7, wherein deleting further comprises first, deleting the web page and second, deleting the referenced objects.

9. The method of claim 6, wherein managing the cached web page and referenced objects comprises the steps of:
   receiving a request from an administrator to delete all cached web pages according to some administrator-specified selection criteria; and
   deleting all cached web pages and referenced objects that satisfy the administrator-specified selection criteria.

10. The method of claim 9, wherein deleting further comprises first, deleting the web page and second, deleting the referenced objects.

11. The method of claim 1, wherein at least one of the referenced objects is not stored in said cache.

12. The method according to claim 1, wherein the cached web page and the referenced objects are automatically managed ensuring the display of a complete web page by referencing a dependency table storing relation information for the cached web page and the referenced objects.

13. The method of claim 1, wherein it is determined that the request is to be responded to by retrieving the web page from the cache when the request matches a cache key.

14. The method of claim 13, wherein the cache key comprises path information, a macro name, an HTML or XML block name, and a query string that caused the web page to be generated.

15. The method of claim 1, where the at least one caching directive comprises at least one line of computer-readable code.

16. The method of claim 1, wherein web server software generates the web page when it is determined that the request is to be responded to by constructing the web page.

17. A method for responding to a request for a web page, comprising:
   determining whether to respond to a request for a web page by retrieving the web page from a cache or by constructing the web page;
   if it is determined that the request is to be responded to by constructing the web page,
      retrieving data and placing data in the web page, wherein the data is linked to other objects,
      determining that the web page is to be cached, wherein the web page references the other objects;
      storing the referenced objects in one or more data stores; and
      caching the web page in the cache;
   if it is determined that the request is to be responded to by retrieving the web page from the cache, retrieving the web page from the cache;

automatically managing the cached web page and the referenced objects to ensure the display of a complete web page; and when one or more of the referenced objects is deleted, deleting the web page from the cache, wherein, when the request matches a cache key, determining that the request is to be responded to by retrieving the web page from the cache, wherein the cache key comprises path information, a macro name, an HTML or XML block name, and a query string that caused the web page to be generated, and wherein the cache key further comprises the form data that caused the web page to be generated.

* * * * *